United States Patent [19]

Stokes

[11] 4,142,312
[45] Mar. 6, 1979

[54] STATION SET FOR MOBILE RADIOTELEPHONE UNITS

[75] Inventor: Rembert R. Stokes, Middletown, N.J.

[73] Assignee: Bell Telephone Laboratories, Incorporated, Murray Hill, N.J.

[21] Appl. No.: 817,353

[22] Filed: Jul. 20, 1977

Related U.S. Application Data

[63] Continuation-in-part of Ser. No. 775,431, Mar. 8, 1977, abandoned.

[51] Int. Cl.$^2$ .................. G09F 3/20; G09F 13/18; G09F 23/06
[52] U.S. Cl. .................. 40/336; D14/52; D14/60; 40/375; 40/404; 40/547; 179/100 R; 179/179
[58] Field of Search .................. 40/371, 373–375, 40/404, 546, 547, 558, 490, 491, 611, 336–339; 179/84 L, 90 T, 100 R, 100 C, 100 D, 101–103, 146 R, 146 L, 178, 179; D14/53, 63, 64, 65, 66, 52, 60; 281/15 R, 15 B; 362/24, 26, 31, 32, 88, 98, 99

[56] References Cited

U.S. PATENT DOCUMENTS

| | | | |
|---|---|---|---|
| 2,362,273 | 11/1944 | Hopp | 40/16.4 |
| 2,998,509 | 8/1961 | Conradt | 362/24 |
| 3,274,345 | 10/1966 | Ham, Jr. et al. | 179/90 CS |
| 3,395,257 | 7/1968 | Clark et al. | 179/100 D |
| 3,491,221 | 1/1970 | Zamarra | 179/178 |
| 3,557,332 | 1/1971 | Walden | 179/100 X |
| 3,837,103 | 9/1974 | Fineberg | 40/336 |
| 3,878,343 | 4/1975 | Van de Wall | 179/100 R |
| 3,941,951 | 3/1976 | Engstrom | 179/179 |
| 3,991,495 | 11/1976 | Wilson | 40/375 |
| 4,056,696 | 11/1977 | Meyerle et al. | 179/100 R |

*Primary Examiner*—Louis G. Mancene
*Assistant Examiner*—G. Lee Skillington
*Attorney, Agent, or Firm*—Charles Scott Phelan

[57] ABSTRACT

A mobile radiotelephone station set base is provided with a pushbutton dialing pad in a first face and has a rectangular card-receiving slot in an adjacent face and opening into a card-receiving pocket extending into the base parallel to the first face. A flexible rectangular card for inscribing frequently used numbers is provided and suitably dimensioned so that when the card is in the base slot and pocket it is deformed for frictionally engaging the pocket walls. This engagement holds the card at any manually selectable degree of penetration into the pocket and such penetration is selected by a user so that a desired number inscribed on the card is indexed at the slot adjacent to the pushbutton dialing pad. The station set is also provided with a built-in source for casting illumination across the face of the pushbutton dial and their controls to facilitate nighttime operation, and it is further provided with a handset-receiving recess in a side of the base and in which a telephone handset can be easily secured against jolts or vibration of a motor vehicle in which the station set is operated.

24 Claims, 15 Drawing Figures

STATION SET FOR MOBILE RADIOTELEPHONE UNITS

Related Application

This application is a continuation-in-part of my application Ser. No. 775,431, filed Mar. 8, 1977, now abandoned, and entitled "Station Set for Mobile Radiotelephone Units."

BACKGROUND OF THE INVENTION

1. Field of the Invention

This invention relates to a mobile radiotelephone station set, sometimes called a control unit. The invention more particularly relates to a station set that has in a base portion both subscriber operated controls and a directory facility for listing frequently called numbers.

2. Prior Art

Telephone users often keep close to their telephone a list of frequently called numbers. Such a list is particularly useful in mobile radiotelephone operation because the subscriber may not have a directory in his vehicle or it may be inconvenient to use a regular directory while the motor vehicle is briefly stopped in traffic. Directory lists for frequently called numbers can, of course, be attached to a blank space on the face of a telephone station set. However, there is usually insufficient space available on a set to record a significant number of telephone numbers if the recorded items are to be of a suitably legible size. A separate larger list could also be loosely attached to a station set, but in a mobile environment such a list is likely to swing back and forth and constitute an annoying diversion to a driver during normal motor vehicle operation.

There are, of course, other ways known in the art for providing directory lists of frequently called numbers at telephone station sets. One such arrangement involves a directory pad which is contained in a small drawer in an auxiliary base member to which the station set base is secured. Alternatively, it is known in the prior art to list frequently called numbers on a strip of paper that is wound on a roller which is attached in a mechanism secured to the outside of the station set. Both such arrangements are somewhat awkward and are obviously inconvenient for mobile radiotelephone operation because, for example, it is difficult with either arrangement to achieve a stable indexing of selected number in a way in which it is readily readable by the vehicle driver and which indexing is automatically retained in spite of vibrations and possible substantial vehicle accelerations in any direction.

Aside from questions of convenience, a mobile radiotelephone must be so configured as to be capable of unobtrusive mounting in a motor vehicle near the driver of the vehicle, and it must be so mountable in all sizes and kinds of vehicles. Thus, a cardinal principle of mobile radiotelephone station set design, and often also of fixed station set design, is to keep the station set to a small size so that the range of possible mounting locations is as large as possible. However, the requirement for a small size conflicts with the desire of many users to have user controlled and user advisory elements of the station set in a single compact location but still easily seen and operated. It particularly conflicts with driver convenience in terms of directory listings of frequently called numbers and in terms of other related aspects such as dialing arrangements, handset hanging arrangements, and arrangements for illuminating station set controls during nighttime operation.

It is, therefore, one object of the invention to improve telephone station sets, particularly those adapted for mobile radiotelephone service.

It is another object to group the principal user controlled and user advisory elements of a station set in a base portion thereof of relatively small size and including at least built-in facilities for dialing numbers and for listing frequently called numbers.

It is another object to locate a directory listing of readily readable size and of conveniently large capacity within a telephone station set containing a conventionally sized pushbutton dialing arrangement.

SUMMARY OF THE INVENTION the foregoing and other objects of the invention are realized in an illustrative embodiment wherein a station set base has a user-operable dialing facility and has an adjacent pocket for receiving a directory listing card such that the insertion of the card into the pocket deforms the card sufficiently to engage frictionally the pocket walls for holding the card in selectable different degrees of penetration into the pocket.

It is one feature of the invention that the pocket extends into the station set parallel to the back of the dialing facility so that a selected number on the card is indexed at the top of the pocket for ease of repeated reference.

It is another feature of one embodiment that the card is curved in a longitudinal partial cylindrical configuration of a first radius when the card is in its natural state, and the card is deformed by the pocket walls to a larger radius of curvature upon insertion into the pocket. In another embodiment the card is flat in its natural state and deformed to a smaller radius of curvature upon insertion.

Yet another feature is that the edge of the card which is to be first inserted into the pocket has a curved profile in the plane of the card so that upon initial insertion of the card into the pocket, the card engages the slot edges in a camming action which automatically deforms the card as it is inserted into the pocket. The curved end of the card also allows a clear way for passage of wires from the dialing facility and other controls at the front of the station set to the back of the station set so as to avoid the need for lenthening the station set for providing such a wiring conduit purpose.

Still another feature is that the dialing facility is a pushbutton pad in which the pushbuttons are partly recessed into the station set and a correspondingly raised island is provided adjacent to the pushbutton dialing pad for containing an illumination source that radiates through lenses in the top and bottom of the island across the outer faces of the pushbuttons, and through light piping arrangements across the card, for facilitating night usage.

Yet another feature of the invention is that there is located behind the card pocket, to be accessed from one side of the base so that it is conveniently located with respect to the directory listing card and the pushbutton dialing pad, a telephone handset receiving channel with a pocket extending into the station set base for enclosing the handset receiver portion so as to secure the handset against inadvertent release due to motor vehicle longitudinal or transverse accelerations.

BRIEF DESCRIPTION OF THE DRAWING

A more complete understanding of the invention may be obtained from a consideration of the following detailed description in connection with the appended claims and the attached drawings in which:

DETAILED DESCRIPTION

The following description is presented in connection with the various views of an illustrative embodiment of the invention and with features of the invention which contribute to the small size of the illustrated telephone station set while retaining convenience of use, particularly in a motor vehicle environment. Arrangements for mounting the telephone station set in a particular location of a particular vehicle comprise no part of the present invention and so are not shown in this application. However, a reader can visualize the illustrated station set mounted, for example, near the center of a motor vehicle dashboard and just below the bottom of the windshield, a location preferred for safety. The mounting arrangements are advantageously adjustable as to height and orientation, a degree of flexibility not usually available in present radiotelephone station sets because of their bulk. The small size and weight of the station set in accordance with the present invention makes such adjustability practical utilizing various adjustable mounting techniques known in the art. For example, a gooseneck type of mount or other universal joint type of mount can be conveniently employed.

Figure 1:
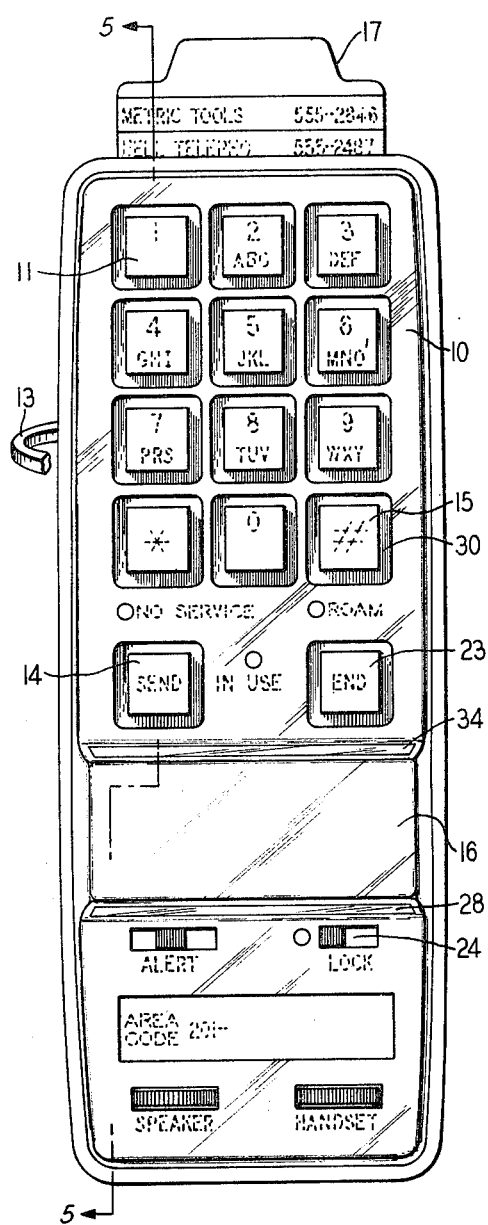
FIG. 1 is a front elevational view of a control face of a telephone station set base in accordance with the present invention.

FIG. 1 illustrates in front elevational view a telephone station set in accordance with the present invention. The discussion which follows employs FIG. 1 as a directional reference in citing left, right, etc. parts of the station set; but it is to be understood that the set operates equally well in any orientation, even inverted, that may be convenient for a particular subscriber. A handset, which is not specifically shown in FIG. 1, is electrically coupled to a base 10 by the usual retractible cord 13 extending from the upper portion of base 10. A twelve-button pushbutton dialing pad is advantageously located near the top of the front face of the base 10 and utilizes buttons in a typical three-by-four button array of approximately conventional pushbutton dialing pad array size. Such a size is large compared to some telephone pushbutton dial pad arrays wherein it is attempted to achieve a small size handset by reducing the size of the dialing pad at the expense of a requirement for substantially greater care on the part of the subscriber in executing the dialing operation accurately. Similarly, alphanumeric indicia are printed on the user-available ends of the buttons so both the buttons and the indicia can be made as large as possible. Only three dialing buttons 11, 12, and 15 of the pushbutton dialing pad are specifically numbered in FIG. 1. The pad takes up substantially the full width of the control face of the station set base 10.

Other control buttons and switches and indicator lights are shown in FIG. 1 and are representative of such devices often found in prior art mobile radiotelephone station sets. For example, in the copending application of J. A. Meyerle and R. R. Stokes, Ser. No. 723,230, filed Sept. 15, 1976, now U.S. Pat. No. 4,056,696 and assigned to the same assignee as the present application, there are shown similar control buttons, switches, and lights. Accordingly, these elements are not herein further discussed in detail except to observe, for reasons that will shortly become apparent, that the SEND button 14, the END button 23, and the LOCK switch 24 involve functions that significantly affect radiotelephone transmission. The SEND button initiates station transmission of a previously dialed number, the END button initiates transmission of an end-of-call signal that has an effect analogous to depressing switchhook buttons in a fixed station set, and the LOCK switch removes power from the mobile unit radio equipment.

A light island 16 of rectangular configuration as viewed in FIG. 1 is advantageously located at an intermediate point in the control panel for illuminating the controls during nighttime operation as will be described hereinafter. The island 16 also serves as a resting pad for part of a subscriber's hand during a dialing operation for enhancing dialing accuracy and at the same time shielding the SEND and END buttons and the LOCK switch from inadvertent operation.

A directory listing card 17 for use by a subscriber in listing frequently called numbers protrudes in a partly removed position from a slot 18 in the top of the illustrated station set. That slot appears, with beveled edges and with the card 17 removed, in the FIG. 3 top view of the illustrated station set. It can be seen in FIG. 1 that the second number of the list on the card 17 is indexed at the top edge of the station set base 10 just above the pushbutton dialing pad so that the number is conveniently readable with minimum eye movement by a subscriber operating the dialing pad. The card 17 is illustrated in a position of full penetration into the station set base in the FIG. 2 partial sectional view taken at line 2—2 in FIG. 4. Card 17 has a curved lower edge for reasons to be subsequently discussed. The card pocket, or envelope, 19 which is entered through the slot 18 extends through substantially the full length and width of the station set in a partition which substantially completely divides the interior of the station set into front and back compartments. This arrangement provides a maximum listed number capacity for card 17 while still retaining convenience of use. In addition, the pocket is built into the station set within the dimensional bounds otherwise necessitated by the pushbutton dialing pad and other controls on the control face of the base 10.

Figure 4:
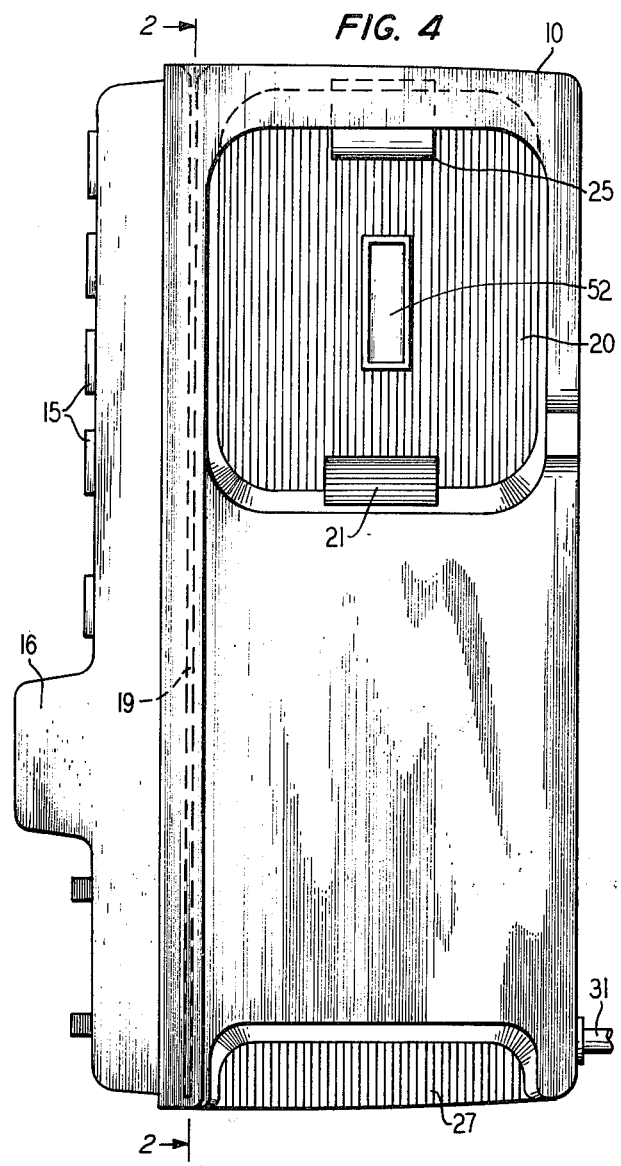
FIG. 4 is a right-hand elevational view of the station set base of FIG. 1.
Figure 6:
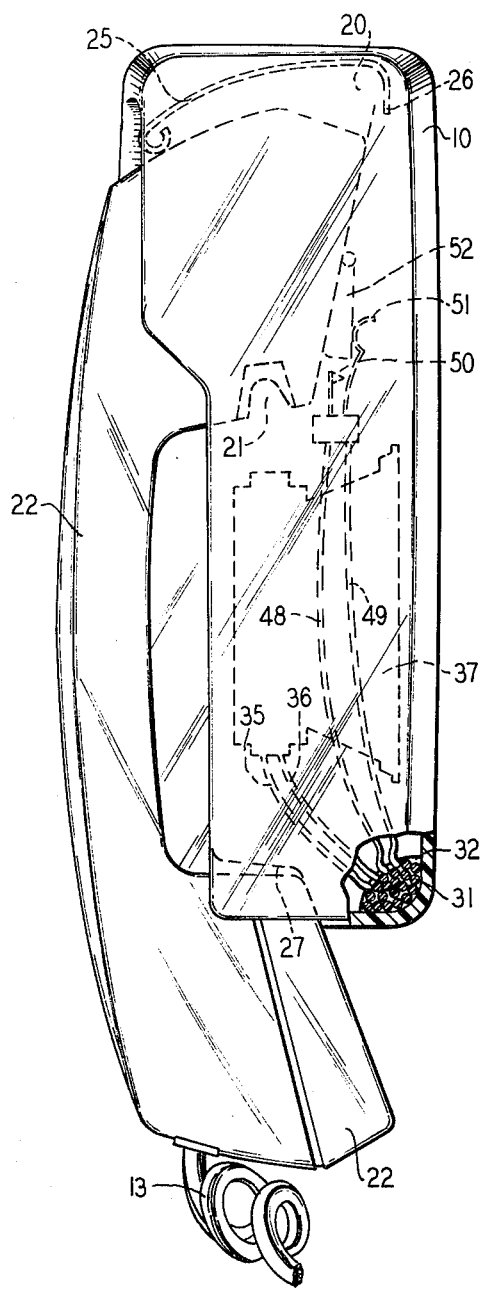
FIG. 6 is a rear elevational view of the station set base of FIG. 1.

The full length of the card pocket 19 is shown in dotted profile in the FIG. 4 right-hand side elevation view of the base 10. FIG. 4 also shows in plan view a handset securing arrangement on the right-hand side of the base 10. Additional detail of that arrangement is found in the side view of the securing arrangement which is shown in the FIG. 6 rear view of the station set base 10. In the upper portion of FIG. 4, the handset securing arrangement includes a pocket 20 which extends upward and into the base 10, immediately behind pocket 19, for receiving the receiver end of a telephone handset. A shoulder 21 on the lower wall of the pocket 20 engages an indentation in the receiver end of the handset 22 as shown in FIG. 6. The handset is advantageously a Western Electric Company K-type handset. A spring 25 is provided in the upper portion of the pocket 20 for urging the handset downward onto the shoulder 21 to maintain the handset in position with a force which is sufficient to that end in the face of different possible orientations of base 10 and of substantial longitudinal or transverse accelerations of the motor vehicle in which the station set may be mounted. One end 26 of the spring 25 is attached to the back wall of the pocket 20. The free end of the spring bears upon the handset 22 for urging it downward onto the shoulder 21. A curved outer end on spring 25 reduces any tendency to scratch handset 22 at the point of contact therewith. In the lower portion of the base 10 as seen in FIGS. 4 and 6, there is provided a one-quarter-cup recess 27 for receiving the transmitter end of the handset 22. This recess steadies the handset and prevents it from rotating in the pocket 20 in response to sharp longitudinal accelerations of a motor vehicle in which the base 10 may be mounted.

Figure 5:
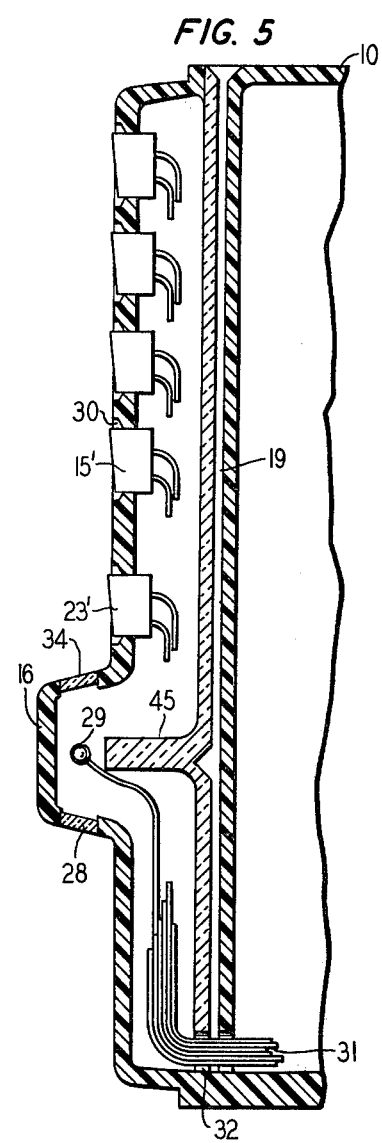
FIG. 5 is a partial sectional view of the station set base of FIG. 4 taken along the lines 5—5 in FIG. 1.

The profiles of the pushbuttons of the pushbutton dialing array and of other controls on the control face of the base 10 are shown in FIG. 4 along with the right-hand profile of the light island 16. The pushbutton in FIG. 4 are shown with flat top surfaces that extend approximately parallel to the plane of the control panel of the station set base 10. FIG. 5 shows a partial sectional view of the station set taken along the lines 5—5 in FIG. 1 but with card 17 removed. In FIG. 5 there is shown a portion of the inside of the light island 16, and it is seen there to include transparent ports containing plastic lenses 34 and 28. These lenses are advantageously tinted to reduce nighttime glare in the vehicle from illumination applied therethrough. In some applications it may also be advantageous to apply limited focusing in these lenses in order to reduce the geometric dispersion of light passing through the lenses to concentrate the light where it is needed.

An electric lamp 29 is mounted in light island 16 for supplying illumination through the lenses 34 and 28. Although a conventional spherical lamp is shown, a cylindrical lamp which extends across substantially the full width of the light island 16 as shown in FIG. 1 can also be employed for increasing the distribution of the illumination across the width of the control panel of the base 10. FIG. 5 also illustrates a modified configuration for the various pushbuttons, such as the pushbutton 15'. In this variation, the end surface of each button is sloped toward the light island 16 in order to increase the illumination actually impinging upon such end surface and thereby enhance the readability of the indicia on the buttons. As also shown in FIG. 5, the various pushbuttons are recessed in individual wells, such as the well 30 around the pushbutton 15'. The well depth is a substantial fraction of the operational travel distance of the button so that it is necessary for the island 16 to protrude less away from the main body of the station set base 10 and still provide illumination of the indicia on the pushbuttons without substantial shadowing effects. Lamp 29 in island 16 provides illumination of all controls and labels, not just the dial buttons, on the station set control panel; and it eliminates the need to take up interior space in the base between the control panel and pocket 19 for back lighting the dial pad. Consequently, the pocket can be very close to the dial pad for convenience of reference to card 17 while dialing. In addition, a translucent region (not shown) can be included in the FIG. 1 face of island 16 to contain, e.g., a manufacturer's trademark to be back lighted by lamp 29.

Figure 5A:
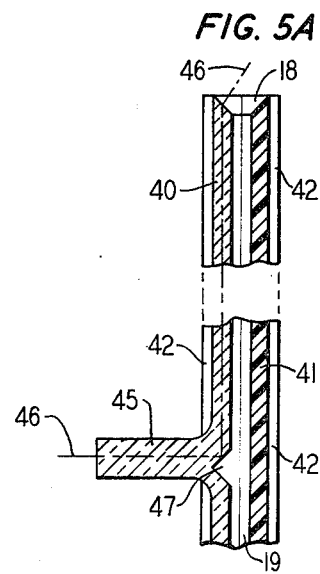
FIG. 5A is an enlarged portion, showing additional detail, of the sectional view of FIG. 5.

The sectional view of FIG. 5 also shows the full extent of the length of the pocket 19 which is spaced somewhat behind and extends parallel to the back of the control panel of the telephone set base 10. When card 17 is in place, it can be read at night since the partition containing pocket 19 is advantageously structured to provide illumination as shown in FIG. 5A. There the partition is shown to distorted scale, the convenience of illustration, and in section through the center of the pocket as it would appear if seen in a FIG. 1-type of front view. The partition is formed of two plates 40 and 41 held face to face within two U-shaped channel members, or tracks, (not fully shown) secured to the side walls of base 10. The top-of-U edges of one such channel 42 are seen in FIG. 5A. Each plate has its respective half of the beveled slot 18 and pocket 19 cut into its face. Plate 41 is advantageously formed of any suitable material such as the same material used for the base 10. Plate 40 is formed of a transparent plastic material such as acrylic and has a formed member 45 molded into the face thereof toward lamp 29 and a notch 47 in the opposite face. The member 45 and notch 47 extend for substantially the full length (assembly a cylindrical lamp) of lamp 29 in the direction perpendicular to the plane of FIG. 5A, but the member 45 is short enough in that direction to allow passage of wires around the ends. As indicated by dashed line 46, light from the lamp is piped into and along plate 40. The beveled upper edge of plate 40 in slot 18 is roughened to diffuse the light onto the region of card 17 projecting out of the slot and facing toward the front of base 10.

Figure 2:
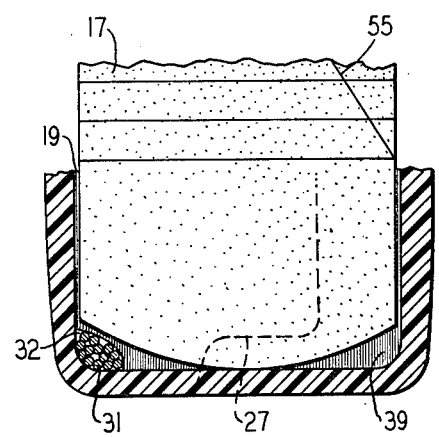
FIG. 2 is a partial sectional view of the station set base of FIG. 1 taken along the lines 2—2 of FIG. 4.
Figure 3:
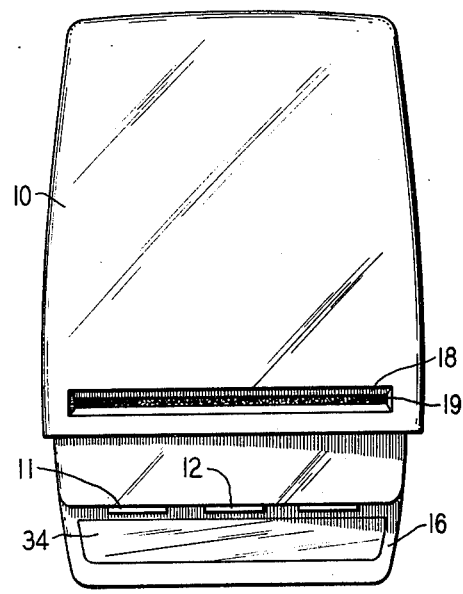
FIG. 3 is a top view of the telephone station set base in accordance with the present invention.

The aforementioned spacing behind the control panel allows clear passage for connecting wires from the pushbutton dialing pad and other control buttons, switches, and indicator lights around member 45 to the bottom of the base 10. At that point, all of the wires 31 are collected as in a cable and pass through an opening 32 in the bottom left-hand corner (as seen in FIG. 2) of the partition containing the pocket 19. This arrangement allows the electrical connections for the various control panel items to pass from the front of the base 10 to the back thereof, and the opening 32 which accommodates this passage is in the lower left-hand corner of the partition not otherwise occupied by the card 17due to the aforementioned curvature in the bottom of the card.

The same arrangement is shown in the lower left-hand portion of FIG. 2, and the wires 31 thus passed extend to the back of the base and out of the back for connection to the remainder of a radiotelephone mobile unit which is conventionally located in a different part of the motor vehicle than is the station set. As seen best in FIG. 2, the region in the lower right-hand corner of the curvature of the card 17 is not similarly used for the passage of wires because the aforementioned one-quarter-cup 27 is located immediately behind that portion of the pocket 19 as seen in FIG. 4 and as indicated by the broken lines in the cross-sectional view in FIG. 2. If in some applications it is desirable to provide mechanical shielding between wires 31 and card 17, the lower portion of the pocket 19 in the region of the opening 32 is not removed so there will be no communications between pocket 19 and opening 32.

The FIG. 6 rear view of the station set base 10, with associated handset 22, has the lower right-hand portion of the base 10 outside surface sectioned away to show the rear end view of the collected wires 31 passing through the opening 32 in the partition containing the pocket 19. The wires 31 gain four additional wires 35 and 36, from a speaker 37, and 48 and 49, from switchhook contacts 50 and 51. The speaker is shown dotted in FIG. 6, and is mounted to face an acoustic port (not shown) through the left-hand side (as seen in FIG. 1, the right-hand side as seen in FIG. 6) of the base 10. Thus, the speaker occupies the space in the base 10 which is bounded by the partition containing the pocket 19, the handset pocket 20, the handset one-quarter-cup 27, and the rear wall of the base 10. Contacts 50 and 51 cooperate with a lever 52 which is actuated by placement of handset 22 into base 10 as shown to open the contacts or by removal of the handset to allow the contacts to close. Lever 52 is advantageously pivoted at the upper end thereof, and it is spring biased (by means not shown) to effect the mentioned contact closure.

Figure 7:
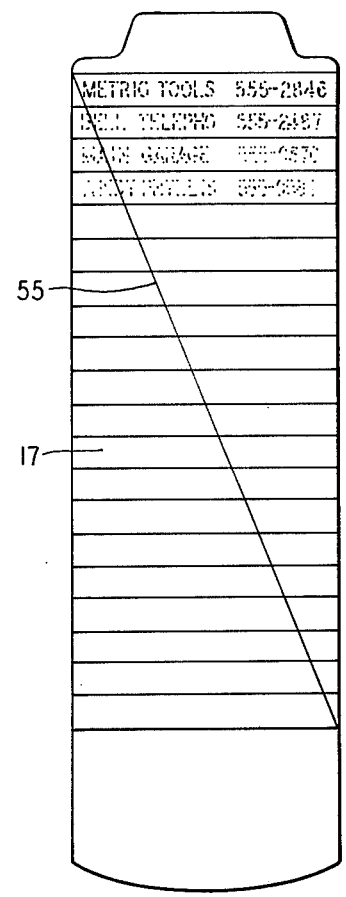
FIG. 7 is a plan view of a directory listing card in accordance with the present invention for use in the station set base of FIGS. 1-6.
Figure 8:
FIG. 8 is an end view of the card of FIG. 7 for one embodiment of the invention.

FIG. 7 illustrates a full plan view of one embodiment of the card 17 as it appers when removed from the base 10, and FIG. 8 is an end view of the same embodiment. The card 17 is advantageously a molded plastic card with a mat finish to facilitate the writing of numbers by a subscriber on the concave face thereof shown in FIG. 7. The writing is placed on the concave face to provide assurance that it will not be smeared as the card 17 is moved into and out of the pocket 19. One suitable plastic for such a card is polycarbonate, sometimes marketed under the trade name Lexan of the General Electric Co. Such material can receive writing when roughened and it is flexible. Alternatively, a flexible steel sheet can be used for the card 17 with a writable, lined coating of plastic or paper bonded to the illustrated concave face. A diagonal line 55 across the face of card 17 provides a user convenient warning when the card is nearly completely removed from the pocket.

Figure 9:
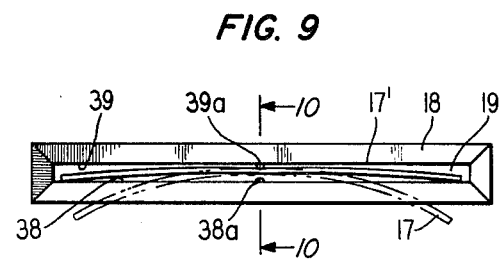
FIG. 9 is a top view in enlarged scale of a directory listing card and card slot in accordance with an embodiment of the present invention.

FIG. 9 shows in enlarged scale the top view of the slot in the top of the base 10 which opens into the pocket 19. The deformed card 17' is shown in place in the slot and pocket 19 with the card edges in frictional engagement with the lower wall 38 of the slot as shown in FIG. 9 and with the longitudinal center line or center portion of the card 17' in frictional engagement with the upper wall 39 of the slot as shown in FIG. 9. Wall 39 is provded with a longitudinal ridge 39a for holding the back of card 17' away from wall 39 to facilitate the use of the back of the card for instructions or additional listings of numbers. A similar ridge 38a is included in the wall 38 for the same purpose when the convex side of the card is used for numbers. Superimposed on the deformed card 17' shown in FIG. 9 is a broken line version of the card 17 in its natural undeformed curvature to illustrate the type of deformation which occurs in the card when it is inserted into the slot and pocket 19.

Figure 10A:
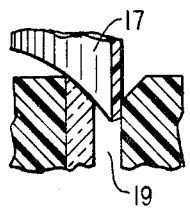
FIGS. 10A and 10B illustrate cooperative action of the card of FIG. 7 and the station set base of FIGS. 1-6.
Figure 10B:
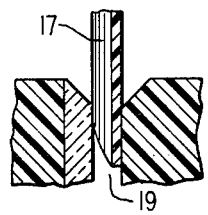

FIGS. 10A and 10B are partial sections of the top of the base 10 taken at the lines 10—10 in FIG. 9. However, the card 17, instead of being essentially fully inserted into the slot and pocket 19, is in only the initial stages of insertion into the slot in order to illustrate a camming action produced between the beveled edges of the slot and the card 17 lower curved edge. In FIG. 10A, the curved tip of the card 17 is shown still in its natural undeformed configuration at the beveled top of the slot. Card 17 is then urged straight downward into the slot and pocket 19. In the course of that operation, the camming action between the beveled edge of the slot and the curved tip of the card deforms the card to its larger radius of curvature until the full tip is in the slot and the card is deformed as illustrated in FIG. 10B and as shown for the card 17' in FIG. 9. It will be appreciated by those skilled in the art that although the ratio of the card 17 surface radius of cylindrical curvature to the card lower edge radius of curvature is not critical, those radii do have a direct proportionally relationship for continued ease of card insertion. Thus, given a set of dimensions for slot 18, the surface radius is selected for a suitable level of friction for ease of card movement without card slippage when not being manually operated. Such a level is a design choice and lies between a level that would damage the card or the base and a level sufficient to prevent the mentioned slippage. Then the card end edge radius is selected to give a convenient level of insertion force in relation to the slot bevel angle without buckling the card. Thus, once suitable radii have been selected, a further change in one of them is usually advantageously accompanied by a proportional change in the other.

Figure 12:
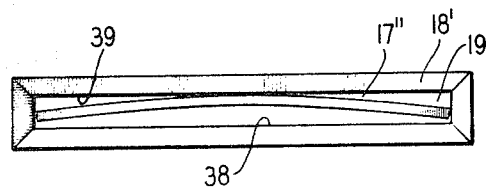
FIGS. 12 and 13 are top views in enlarged scale of different card slot embodiments for utilizing the card of FIG. 11.
Figure 11:
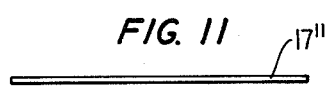
FIG. 11 is an end view of the card of FIG. 7 for another embodiment of the invention.

Another embodiment of the invention utilizes a naturally flat card which in plan view is the same as that illustrated in FIG. 7, but in end view it is as shown in FIG. 11. Such a flat card is useful in at least two ways. In one way the natural width of the card is somewhat greater than the width of a smooth-sided slot 18' so that insertion of the card into the slot results in deformation of the card to form a substantially cylindrically curved surface as shown in FIG. 12. There the long edges of card 17'', as deformed, frictionally engage the short end walls of slot 18', the width of the card having been selected so that its longitudinal center portion does not contact the slot wall 39 when the long edges of the inserted card are adjacent to the slot wall 38.

Figure 13:
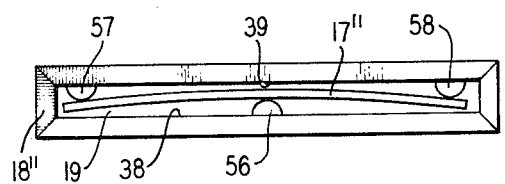

In a further embodiment using a flat card, a slot 18'' shown in FIG. 13 is equipped with interleaved ridges on the walls 38 and 39 of slot 18'' and the cooperating pocket 19. These ridges, shown in end view in the drawing, each projects perpendicularly from its respective wall by a distance which is sufficiently greater than one half of the difference between the distance between those walls, and the thickness of card 17'' to be sure that there will be sufficient card deformation to set up the necessary card-holding frictional engagement. To this end one such ridge 56 is located in the center of wall 38, and two others 57 and 58 are located on either side portion of wall 39. It will be apparent to those skilled in the art that the slot 18'' also accommodates a curved card of the type shown in FIG. 8 as long as the curvature of such card, when inserted, does not nautrally sufficiently conform to the peaks of the ridges 56–58 to impair the card-holding frictional engagement.

Although the present invention has been shown in connection with particular embodiments thereof additional embodiments, modifications, and the applications of the invention which will be obvious to those skilled in the art are included within the spirit and scope of invention.

What is claimed is:

1. A telephone station set having dialing means and further comprising
    a card-receiving pocket in said set and having an entry slot in a surface of said set adjacent to said dialing means, and
    a flexible card having at least one surface conditioned to receive writing, said card being so configured with respect to said slot that insertion of said card through said slot into said pocket deforms said card sufficiently to engage frictionally the slot sides for holding said card in selectable different degrees of penetration into said pocket.

2. The station set in accordance with claim 1 in which
    said pocket has in at least one side thereof a ridge running from said slot into said pocket and extending substantially perpendicularly from that side into the pocket for providing frictional engagement with a longitudinally central portion of said card.

3. The telephone station set in accordance with claim 1 in which
    said slot is rectangular in shape, and
    said card is curved in a partial cylindrical fashion in which cylindrical elements are parallel to a longitudinal center line of said card and perpendicular to the plane of said slot when said card is being inserted into said slot.

4. The telephone station set in accordance with claim 3 in which
    a first edge of said card which is transverse to said cylindrical elements is in a substantial portion thereof not perpendicular to said elements, and
    said edge is the first portion of said card to engage said slot upon insertion of said card into said slot and that the perpendicular distance between a first plane including the longitudinal edges of said card in its natural cylindrically curved configuration and a parallel plane including a longitudinal center line of said card is sufficiently greater than the smaller dimension of said rectangular slot so that upon insertion of said card into said slot said first edge of said card is deflected by one of said rectangular slot longer sides to deform said card to a sufficiently larger cylindrical radius of curvature to cause frictional engagement between said edges and center line of said card and the longer sides of said rectangular slot to hold said card in any selectable degree of penetration into said pocket.

5. The telephone station set in accordance with claim 1 in which
    said card is substantially flat in its natural unrestrained state.

6. The telephone station set in accordance with claim 5 in which
    said pocket has in opposed sides thereof ridges running from said slot into said pocket and each extending perpendicularly from the respective sides into the pocket a sufficient height for cooperating with one another to deform said card upon insertion thereof.

7. The telephone station set in accordance with claim 6 in which
    said height is greater than one half of the difference between the distance between the opposed sides and the thickness of said card.

8. The telephone station set in accordance with claim 5 in which
    the pocket has a rectangular cross section of predetermined width and depth at least at said slot, and
    said card has a width greater than the width of said cross section so that upon insertion of the card it frictionally engages the depth sides of said slot.

9. The telephone station set in accordance with claim 1 in which
    said dialing means is a pushbutton dialing pad in a first face of said telephone station set, and
    said slot is in a second face of said set which is substantially perpendicular to said first face so that said pocket extends into said set substantially parallel to and behind said pushbutton dialing pad.

10. The telephone station set in accordance with claim 9 in which
    said card has a width in a direction parallel to said pad which is substantially the same as the inside width of said station set, and
    said card has a length in a direction parallel to said pad which is greater than the inside length of said base.

11. The telephone station set in accordance with claim 10 in which
    a space is provided inside said station set between the back of said dialing pad and said pocket and said space includes cabling means collecting electrical connections from said pushbutton dialing pad,
    said pocket is contained in a partition substantially completely separating the aforementioned space from the rear portion of the inside of said station set,
    said card has a transversely curved lower edge and said pocket has a correspondingly curved lower edge so that a first portion of said pocket extends to the bottom of said set, and
    said partition has an opening therethrough in the lower portion thereof beneath a second portion of said pocket for passing said cabling means from said space to the rear portion of said station set.

12. The telephone station set in accordance with claim 1 in which
    said dialing means is a pushbutton dialing pad having a faceplate through which a plurality of operable pushbuttons extend, and
    said faceplate includes circumferentially around each of said pushbuttons a recessed well portion so that each of said buttons projects beyond the major surface of said faceplate at the top of its well a distance which is only a fraction of the full operative distance of travel of such pushbutton.

13. The telephone station set in accordance with claim 12 in which there are provided
    a lighting island adjacent to said pushbutton dialing pad, and
    means, mounted within said island, for illuminating exposed ends of pushbuttons of said pad through a port in a side of said island.

14. The telephone station set in accordance with claim 13 in which said ends of said pushbuttons lie in planes which are substantially perpendicular to the direction of operative travel of said pushbuttons.

15. The telephone station set in accordance with claim 13 in which
said ends of said buttons are respectively sloped so that sloped faces thereof at least partially face said port in said lighting island.

16. The telephone station set in accordance with claim 13 in which
said lighting island extends transversely across a face of said station set,
said station set includes said pushbutton dialing pad on one side of said island and additional control elements on the opposite side of said lighting island,
said island includes at least one additional light port for passing illumination across said additional controls, and
said island ports are sufficiently spaced from said face of said station set so that illumination radiated from said illuminating means through said ports extends across said ends of said pushbuttons for illuminating indicia thereon without substantial shadowing.

17. The station set in accordance with claim 1 in which there is provided
handset-receiving means on a side of said set adjacent to said dialing means and said slot, said receiving means including a recess in the last-mentioned side of said set.

18. The station set in accordance with claim 17 in which
said recess includes a further pocket, extending upward and into said set for enclosing substantially one full transducer end of a telephone handset, and
a shoulder member, secured to a wall of said further pocket projects into said further pocket for engaging said transducer end to hold said handset in said recess.

19. The station set in accordance with claim 18 in which
spring means are secured to a wall of said further pocket for urging said one transducer end into engagement with said shoulder.

20. The station set in accordance with claim 18 in which
said recess includes a partial-cup indentation, at an end of said set remote from said further pocket, for receiving a second transducer end of a telephone handset in a sufficient engagement to restrain said handset against rotation about said one transducer end in said further pocket.

21. The station set in accordance with claim 20 in which
a loudspeaker is mounted in said set between said further pocket and said partial-cup indentation for radiating sound waves through a side of said set opposite to said handset receiving recess.

22. The station set in accordance with claim 13 in which
said set includes user-operable control means mounted for altering signal transmission capability of said set, and
said control means are mounted closely adjacent to said island so that said island also serves as a standoff for a user's hand when operating said dialing means to reduce the chance of inadvertent operation of said control means.

23. The station set in accordance with claim 1 in which
a portion of said card extends outside of said set when the remainder of the card is in said pocket, and
means are provided for illuminating both said dialing means and at least a part of said extended portion of said card.

24. The station set in accordance with claim 23 in which said illuminating means comprises
a source of light located to radiate across said dialing means,
a light-transmitting wall in said pocket on the side thereof facing said source, and
said light-transmitting wall including means for conducting light from said source into and along the plane of said wall to exit therefrom adjacent to said card portion.

* * * * *